UNITED STATES PATENT OFFICE 2,040,065

PROCESS OF MERCERIZING

Donald H. Powers, Moorestown, N. J., and Louis H. Bock, Bristol, Pa., assignors to Röhm & Haas Company, Philadelphia, Pa.

No Drawing. Application July 3, 1933, Serial No. 678,920

5 Claims. (Cl. 8—20)

This invention comprises improvements in and relates to the treatment of cellulose or cellulose-like bodies with compounds possessing a swelling or dispersing action.

It is the object of this invention to effect the mercerization of cellulose materials to give products of high luster and strength. It is a further object of this invention to carry out the swelling or mercerization of cellulose over a wide range of temperature. It is a further object of this invention to accelerate and activate the mercerizing effect of inorganic hydroxides.

It has long been known that aqueous solutions of alkali and of many organic bases possess a swelling action for cellulose. Sodium hydroxide has long been used as a mercerizing agent due to the fact that it possesses a swelling action on cellulose producing a fiber with increased luster and strength. It is shown by Knecht and Harrison (Journal of the Society of Dyers and Colorists, 28, 224 (1912)) and also by Dehnert and König (Celluloschemie, 6, 1 (1925)) that an organic base such as tetramethylammonium hydroxide produces considerable swelling of cellulose materials. We have found a marked differentiation between those compounds which effect a swelling of cellulose and those compounds which actually dissolve this material to form aqueous solutions or dispersions of cellulose with a concentration of 3 to 15%.

Schwalbe & Robinoff (Z. angew. Chem., 24, (1911) 256–258) showed that pure cotton had a solubility of 0.06% in 8% caustic. They also show that the more degraded the cotton the higher the solubility. In general, however, cellulose is not considered soluble in sodium hydroxide and the repeated processing of cellulose materials and fabrics in alkali solutions of widely varying concentrations has confirmed this. It is well known that cotton piece goods are boiled under pressure with 3% caustic for 20 to 40 hours without harming the cellulose, purely for the removal of the extraneous gums and waxes.

The degree of mercerization is frequently used as the measure of the swelling of cellulosic materials and we find that organic bases vary widely in their apparent swelling and value as mercerizing agents. For example, a solution of tetramethylammonium hydroxide with a concentration of 25%, under carefully controlled conditions, appears to give a mercerization comparable with that obtained with sodium hydroxide and yields an increase of strength of 15 to 18%. Solutions of higher concentration of this hydroxide cannot be readily prepared, as its hydrate crystallizes from aqueous solutions. Aqueous solutions of guanidines, such as guanidine, monomethyl guanidine, dimethyl guanidine and butyl guanidine, even up to concentrations of 50%, appear to have very little swelling or mercerizing action and no increase in the strength of cotton yarns can be detected when run under conditions identical with those run with sodium hydroxide.

In our co-pending application, Serial No. 676,530, Patent No. 2,009,015, dated July 23, 1935, we have shown that quaternary ammonium bases of relatively high molecular weight, notably those containing a benzyl group, are unique and striking in their action on cellulose. We find that these benzyl substituted ammonium hydroxides in concentrated aqueous solution effect a rapid and substantially complete solution of cellulose materials. We have also found that more dilute solutions of benzyl substituted ammonium hydroxides are not rapid solvents for cellulose, but are active swelling and mercerizing agents. When a 42% solution of dimethylbenzylphenylammonium hydroxide is diluted with an equal weight of water to a 21% solution, it loses its action as a rapid solvent and becomes a powerful swelling or mercerizing agent. These dilute solutions of quaternary bases may be used as mercerizing agents and yield products of high luster and strength.

We also find that the addition of small amounts of benzyl substituted ammonium hydroxides to mercerizing solutions of sodium hydroxide markedly improves their penetration of cotton yarns and the resulting material has an improved luster and feel.

We find that dilute solutions of benzyl substituted quaternary ammonium hydroxides are more effective mercerizing agents than solutions of other organic bases such as tetramethylammonium hydroxide, guanidine or methyl guanimonium hydroxide, etc. A 25% solution of trimethylbenzylammonium hydroxide gives a 33% increase in tensile strength when mercerization is carried out for 5 minutes at 0° C. A 20% solution of sodium hydroxide shows an increase in strength of only 16% when the run is under similar, carefully controlled conditions.

We find that when cellulose material such as cotton sheeting is run into a dilute solution of a benzyl substituted ammonium hydroxide and dried by running through a stream of hot air or passing over dry cans, the quaternary ammonium hydroxide concentrates in the material effecting a gelatinization of the fiber, giving a permanent finish on calendering which is fast to washing.

The action of dilute caustic solutions on cotton grey goods appears to be improved by the addition of a benzyl substituted ammonium hydroxide with or without the presence of soap. We find, for example, that when a small amount of trimethylbenzylammonium hydroxide is added to a 3% solution of sodium hydroxide with 1% of sodium oleate in a kier boil that cleaner whites are obtained and that the time required for kier boiling may be materially shortened.

We have found that compounds of the following general formula appear to be unique as swelling and mercerizing agents for cellulose:

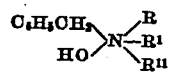

where $R$, $R^1$, $R^{11}$ are alkyl, aryl and aralkyl groups or substituted derivatives thereof.

Among the benzyl substituted quaternary ammonium hydroxides which have been found to be suitable are: trimethylbenzylammonium hydroxide, triethylbenzylammonium hydroxide, dimethylphenylbenzylammonium hydroxide, diethylphenylbenzylammonium hydroxide, dimethyltolylbenzylammonium hydroxide, dimethylamylbenzylammonium hydroxide, dimethyldibenzylammonium hydroxide and benzyl pyridonium hydroxide.

It is clear to anyone skilled in the art that other benzyl substituted quaternary ammonium hydroxides would also be effective; for example, the methyl groups in trimethylbenzylammonium hydroxide may be replaced by other alkyl groups such as propyl, butyl, etc., and a phenyl group in a product such as dimethylbenzylphenylammonium hydroxide might be replaced by tolyl, xylyl or naphthyl groups. The following examples will serve to illustrate our invention:

(1) Cotton yarn was run through a mercerizing bath containing a 1.5 normal solution of trimethylbenzylammonium hydroxide. The yarn was wet with this solution for 3 minutes under tension. This yarn was then given a water wash, a thorough soaping, rinsed and dried. It proved to have 35% greater tensile strength than the untreated yarn and possessed a good luster.

(2) Cotton sheeting was run into a 30% solution of dimethylbenzylphenylammonium hydroxide and piled in boxes and allowed to stand for 3 to 5 minutes. At the end of this time it was run directly into an open tub, given a thorough water wash which was followed by a boiling soap. The resulting fabric, on calendering, had a high luster and a rayon-like appearance.

(3) Cotton broadcloth was run through a 10% solution of dimethyldibenzylammonium hydroxide. The impregnated fabric was then passed through a hot air drier or hot air heated tenter frame. Following this treatment the fabric was run into a dilute acid solution followed by a rinsing with a solution containing 1/16 to 1/2 of 1% of sodium lauryl sulphate. A permanent finish is obtained which is not readily removed by repeated washings.

(4) A rayon alpaca was run through an 8% solution of triethylbenzylammonium hydroxide at room temperature and given a tight squeeze before running through a battery of rotating dry cans heated with warm air. The fabric was then run into a boiling soap solution, rinsed, dried and given a friction calender to produce a finish resembling a linen fabric.

(5) Cotton broadcloth was mercerized in the usual manner on a mercerizing frame at room temperature with a 20% solution of sodium hydroxide containing 1% trimethylbenzylammonium hydroxide. Good mercerization was obtained in 3 minutes and the goods were run into cold water followed by an immersion in 3% sulphuric acid. They were then washed in water and dried.

It will be recognized by one versed in the art that deviation can be made in the above examples without departing from the spirit of the invention, the scope of which is limited only by the following claims.

What we claim is:

1. A process of mercerizing which comprises treating cellulose bodies with a dilute aqueous solution of a quaternary benzyl ammonium hydroxide.

2. A process of mercerizing which comprises treating cellulose bodies with a dilute solution of a compound of the general formula

where $R$, $R^1$, $R^{11}$ are alkyl, aryl, and aralkyl groups and substituted derivatives.

3. A process of mercerizing which comprises treating cellulosic bodies with caustic soda to which has been added a small amount of a quaternary benzyl ammonium hydroxide.

4. A process of mercerizing which comprises treating cellulose bodies with a solution of a quaternary benzyl ammonium hydroxide of a concentration not over 25%.

5. A process of mercerizing which comprises treating cellulosic bodies with a solution containing a quaternary benzyl ammonium hydroxide.

DONALD H. POWERS.
LOUIS H. BOCK.